2,902,373

EGG PRODUCTS

Benjamin R. Harris, Glencoe, Ill.

No Drawing. Application December 6, 1955
Serial No. 551,214

9 Claims. (Cl. 99—196)

This invention relates to new and useful egg products, especially egg white products.

It has heretofore been disclosed (U.S. Patent No. 2,637,654) that the time of beating egg whites to a good foam can be shortened, and the tolerance to overbeating can be increased, by adding to liquid egg whites small proportions of certain specific esters, namely, esters of tartaric, malic, malonic, citric and succinic acids with aliphatic alcohols containing less than 3 carbon atoms. Illustrative of said esters are diethyl tartrate, diethyl malate and triethyl citrate. Esters of the aforesaid acids with aliphatic alcohols containing 3 or more carbon atoms are excluded by the express teachings in the patent, tripropyl citrate, for instance, being ineffective and inoperative to improve the whipping properties of egg whites.

It has also heretofore been proposed (U.S. Patent No. 2,667,419) to prepare dehydrated food products, including, for instance, milk powders, egg powders, dried coconut and the like, by incorporating thereinto, prior to the dehydration step, small proportions of mono-alkyl citrates or mono-alkylene citrates. Such latter compounds, comprising from 0.001 to 0.2%, preferably 0.008 to 0.05%, by weight of the dehydrated food product, are stated to be utilized for the purpose of retarding the development of undesirable changes in color, flavor and odor when said dehydrated food products are exposed for relatively long periods of time at temperatures above 45 degrees F. Among the mono-alkyl citrates, or, in other words, citric acid mono-esters, disclosed in said Patent No. 2,667,419 are those derived, for instance, from such alcohols as ethanol, propanols, octanols, decanols, dodecanols, hexadecanols, octadecanols, etc., typical examples being (1) mixtures containing 60% mono-isopropyl citrate, 35% di-isopropyl citrate and 5% tri-isopropyl citrate, used to the extent of about 0.023 pound in admixture with 400 pounds egg yolks and 40 pounds water prior to dehydration to produce an egg yolk powder, and (2) mixtures containing 60% mono-n-propyl citrate, 35% di-n-propyl citrate and 5% tri-n-propyl citrate, used to the extent of 45 grams in admixture with 500 pounds of liquid egg whites prior to dehydration to produce a dried egg white. The disclosures in said Patent No. 2,667,419 do not relate in any way to enhancement of the whipping characteristics of egg whites nor do they distinguish between those citric acid esters, or the proportions thereof, which are inherently capable and those which are inherently incapable of enhancing the whipping properties of egg whites, nor do they teach the use of anything beyond the employment of mono-alkyl and mono-alkylene citrates or such citrates which contain predominate proportions of the mono-alkyl and mono-alkylene citrates.

In accordance with the present invention, the surprising and unexpected discovery has been made that, while tripropyl citrate, and higher alcohol citrates, for instance, are inoperative to improve the whipping properties of egg whites and the tolerance to overbeating, the di- and tri-esters of citric acid with isopropyl alcohol are highly effective for these purposes. Such esters also include mixtures containing predominant proportions of the isopropyl alcohol di- and tri-esters of citric acid. Of outstanding utility are the isopropyl alcohol di-esters of citric acid which, in substantially pure form, are white needle-like crystalline materials, or mixtures of the isopropyl alcohol esters of citric acid containing predominantly, for example, at least 50%, of the isopropyl alcohol di-ester of citric acid. The isopropyl alcohol tri-ester of citric acid is an oily liquid generally immiscible with water. The reason or reasons why the citric acid esters derived from normal propyl alcohol are inoperative and why the di- and tri-esters of citric acid with isopropyl alcohol are highly effective has not been ascertained but the fact has been demonstrated. The isopropyl alcohol di- and tri-esters of citric acid may be represented by the formula

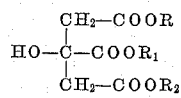

where $R$, $R_1$ and $R_2$ are each hydrogen or the isopropyl radical

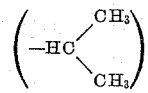

with the proviso that at least two of $R$, $R_1$ and $R_2$ are the isopropyl radical.

The isopropyl alcohol esters can be prepared in accordance with conventional esterification procedures. The isopropyl alcohol, acid, organic solvent such as benzene, in appropriate proportions with the isopropyl alcohol usually being present in excess over stoichiometric proportions (with or without a catalyst, e.g. sulfuric acid), are subjected to azeotropic distillation until the requisite quantity of water is collected. The reaction vessel is fitted with a packed column capable of separating the desired azeotrope. The amount of isopropyl alcohol in the aqueous layer separated is determined by density measurements. Upon reaching the desired stage of the reaction, the reaction mixture, in those cases where sulfuric acid is utilized, is treated with twice the amount of precipitated calcium carbonate necessary to react with the sulfuric acid used. The benzene and excess isopropyl alcohol are removed by distillation under reduced pressure. The residue is dissolved in an appropriate organic solvent, for instance, ether, and filtered. The isopropyl alcohol ester is recovered from the ether solution by any suitable means, for example, by precipitation through the addition of petroleum ether or other precipitant. The isopropyl alcohol ester is usually obtained in the form of a mixture which may, if desired, be purified.

The isopropyl alcohol di- and tri-esters of citric acid must be used in proportions sufficient to enhance appreciably the whipping properties of the egg whites. In the case of ordinary liquid egg whites or frozen liquid egg whites, the proportions will usually range, for instance, from 0.01% to about 0.06%, by weight of said liquid egg whites, a particularly desirable range being about 0.02% to 0.04%. In the case of dried egg whites or dried egg albumen, the proportions will usually range from about 0.1% to about 0.5%, by weight of said dried egg whites or albumen, about 0.2% to 0.3% being a good average. The desired optimum proportions, in any given case, can very readily be ascertained by simple test.

In addition to obtaining marked improvement in reduction in whipping time to achieve a good foam, and increase in overbeating tolerance, the isopropyl alcohol tri-ester of citric acid, for instance, when added to the egg albumen as, for example, by spraying it over dried egg albumen, imparts excellent anti-dusting characteristics to the dried egg albumen so that it may be packaged and handled generally with a distinct improvement in relation to the problem of dusting.

The following examples are illustrative of compositions falling within the scope of the invention. All parts listed are by weight.

*Example 1*

| | Parts |
|---|---|
| Fresh liquid egg whites | 100 |
| Isopropyl alcohol di-ester of citric acid | 0.025 |

*Example 2*

| | |
|---|---|
| Fresh liquid egg whites | 100 |
| Isopropyl alcohol mixed esters of citric acid containing predominantly the di-ester | .025 |

*Example 3*

| | |
|---|---|
| Fresh liquid egg whites (acidified with lactic acid to pH 6.9) | 100 |
| Isopropyl alcohol di-ester of citric acid | .02 |

*Example 4*

| | |
|---|---|
| Fresh liquid egg whites (acidified with lactic acid to pH 5) | 100 |
| Isopropyl alcohol di-ester of citric acid | .03 |

*Example 5*

| | |
|---|---|
| Dried egg albumen (prepared by treatment with glucose oxidase-catalase enzyme system) | 100 |
| Isopropyl alcohol di-ester of citric acid | 0.325 |

*Example 6*

| | |
|---|---|
| Dried egg albumen (plus citric acid to produce pH 5) | 100 |
| Isopropyl alcohol di-ester of citric acid | 0.225 |

*Example 7*

| | |
|---|---|
| Dried egg albumen | 100 |
| Isopropyl alcohol tri-ester of citric acid | 0.23 |

*Example 8*

| | |
|---|---|
| Frozen liquid egg whites | 100 |
| Isopropyl alcohol di-ester of citric acid | 0.025 |

*Example 9*

| | |
|---|---|
| Frozen fermanted liquid egg whites | 100 |
| Isopropyl alcohol tri-ester of citric acid | 0.025 |

*Example 10*

| | |
|---|---|
| Frozen liquid egg whites | 100 |
| Isopropyl alcohol mixed di- and tri-esters of citric acid (containing about equal parts of said di- and tri-esters) | 0.025 |

*Example 11*

| | |
|---|---|
| Liquid whole eggs | 100 |
| Isopropyl alcohol di-ester of citric acid | 0.03 |

As indicative of the effect of the addition of the isopropyl alcohol di- and tri-esters of citric acid to egg whites, the following examples may be noted.

A. To 300 ml. freshly broken liquid egg whites 150 ml. of water are added. Foam heights are measured in the following manner. The mixture of egg whites and water is mixed (in a Hobart mixer, Model No. C10, in a 10 quart bowl and using a standard wire loop whip) at medium speed for 1½ minutes and then for an additional 1½ minutes at high speed. The mixing bowl is removed from the machine and the foam knocked off the wire loop whip into the mixing bowl. The foam is then leveled by hand to form a continuous smooth surface. The height of the foam is then measured with a ruler. In the case of the control (containing only the liquid egg whites and the water), the foam height is 5¼ inches. With the addition of 0.025%, based on the weight of the 300 ml. of said liquid egg whites, of isopropyl alcohol di-ester of citric acid, the foam height is 6 inches and the foam has a very desirable firmness. With the addition of the isopropyl alcohol triester of citric acid, the foam height is 6 inches, the foam being somewhat softer than that where the di-ester is used.

B. In a test similar to the A test, but wherein the pH of the liquid egg whites is initially reduced to 6.9 by the addition of lactic acid, the foam height of the control is 5 inches; and, with the addition of 0.025% isopropyl alcohol di-ester of citric acid, the foam height is 6¾ inches.

C. In a test similar to the A test, but wherein the pH of the liquid egg whites is initially reduced to 5 by the addition of lactic acid, the foam height of the control is 3 inches; and, with the addition of the isopropyl alcohol di-ester of citric acid, the foam height is 5½ inches, the foam having very desirable dryness and stiffness. With mixed isopropyl alcohol esters of citric acid containing predominantly the tri-ester of citric acid, the foam height is 5½ inches but the foam is somewhat softer than with the di-ester.

D. To 41 grams dried egg albumen (prepared in accordance with a known process involving treating the liquid egg whites with a glucose oxidase-catalase enzyme system in the presense of added hydrogen peroxide appreciably to reduce the glucose content thereof, followed by drying said treated liquid egg whites) 430 ml. water are added. The procedure described in A is followed. The foam height of the control is 5¼ inches. With the addition of 0.25%, based on the weight of the dried albumen, of the isopropyl alcohol di-ester of citric acid, the foam height is 6½ inches and the foam is distinctly firmer than that of the control.

E. In a test similar to D, but wherein 1 gram of citric acid is added to bring the pH to just below 5, the control forms a coupy mixture which could not be considered a foam. With the addition of 0.25% of the isopropyl alcohol di-ester or the tri-ester of citric acid, foam heights of 4¾ inches and 4½ inches, respectively, are obtained.

F. In a test similar to the A test, but using a different source of fresh liquid egg whites, the height of the foam, in the case of the control, is 4½ inches. With the addition of 0.025% of a reaction mixture containing approximately equal amounts of the isopropyl alcohol di- and tri-esters of citric acid, the height of the foam is 6 inches and is somewhat drier than that of the control.

G. 40 grams dry powdered egg albumen (of the type described in D), 80 grams sucrose and 300 cc. water are placed in the bowl of a Hamilton Beach mixer and mixed for 2 minutes at slow speed to effect solution, no foam being generated under these conditions. Then mixing is effected at high speed to a stiff peak foam. The time of mixing at high speed to reach a stiff peak foam is measured by means of a stop watch. The control, which produces a wet relatively unstable peak foam, requires 3½ minutes mixing at high speed. With the addition of 0.2% of the isopropyl alcohol di-ester of citric acid, 3 minutes are required to produce a stiff peak foam which is desirably dry and which has a greater total volume than the control.

H. In a test similar to the G test, but wherein 1 gram citric acid is added to reduce the pH to just below 5, the control requires 8 minutes to reach the peak foam stage. With the addition of 0.2% of the isopropyl alcohol di-ester of citric acid, the time required to reach the peak foam stage is 5 minutes, and the foam is of greater volume and drier character than that of the control.

I. In a test similar to the G test, but using 305 ml. of fresh liquid egg whites containing 1 gram of cream of tartar (which brings the pH of the liquid egg whites down to about 7), 80 grams of sugar are added in 20 gram increments every 15 seconds. The control reaches a stiff peak foam in 4 minutes of mixing at high speed. With the addition of 0.025% of a reaction mixture containing approximately equal amounts of the isopropyl alcohol di- and tri-esters of citric acid, a stiff peak foam is reached after 3¼ minutes of mixing at high speed, and a much greater meringue volume is obtained over that of the control.

The invention is especially applicable to the treatment of liquid egg whites or frozen liquid egg whites, either untreated or modified, in the liquid stage, in various ways as, for instance, by fermentation under natural conditions, by cultures of acid or alcohol forming organisms, by yeast or bacterial treatment, or by glucose oxidase-catalase treatment, all of which procedures serve to effect a reduction in the glucose content of the egg whites. The invention is likewise of utility in egg white products having varying pH values as, for instance, of the order of 9, as in the case of freshly broken eggs, or of lesser values, such as 8, 7 or even as low as about 5, as may result from the use of cream of tartar or acid additions such as of lactic, citric, tartaric or other edible acids or of buffer salts such as monosodium acid phosphate. Although, as indicated above, the invention is especially applicable to the production of liquid egg whites (which may subsequently be frozen) treated or modified or not, to which have been added the isopropyl alcohol di- and tri-esters of citric acid, as previously described said liquid egg whites (or thawed frozen egg whites) may be dried, for instance, by pan drying, spray drying, foam drying or other drying procedures and the resulting dried egg albumen, when reconstituted with water in accordance with conventional practices, exhibits improved whipping properties. The isopropyl alcohol di- and tri-esters of citric acid can also be admixed with previously dried egg whites or albumen, and, in such case, it is desirable to effect a substantially uniform distribution of said esters through the dried egg whites or albumen.

The improved egg white products of the present invention can be used effectively and with marked advantage in the baking of cakes, notably angel food cakes, in angel food prepared cake mixes, in the candy and confectionery field, in meringue powders, in marshmallows, in cream toppings, and, in general, for the uses to which egg whites are commonly put, and where the advantages of improvement in beating or whipping characteristics are a desideratum. In the production of angel food cakes, the egg white products of the present invention tend, in general, to cause a more rapid rise in foam in the mixing bowl in the making of the cake batter and to produce a foam having a lower density, and the resulting baked cakes are characterized by superior volume, texture and appearance.

The term "egg white," as used in the claims, is intended to encompass generically the liquid egg whites, concentrated or diluted liquid egg whites, frozen egg whites, and dried egg whites, unless the context expressly indicates otherwise. The term "egg product" is used in a generic sense to include egg white, whole egg and yolk products which can be beaten or whipped to embody and hold air therein. In this latter connection, it may be pointed out that, while the invention has been described mainly in connection with the production of egg whites, where it has its most important and significant advantages, it also is of utility, as indicated, in connection with other egg products which contain substantial proportions of egg yolks as, for instance, whole eggs and egg yolk products which, in use, are beaten or whipped to incorporate air thereinto.

What I claim as new and desire to protect by Letters Patent of the United States is:

1. An improved egg product containing at least one member selected from the group consisting of isopropyl alcohol di- and tri-esters of citric acid, said ester being present in proportions, on the dry weight basis, of 0.1% to about 0.5%.

2. An improved egg white containing di-isopropyl alcohol ester of citric acid, said ester being present in proportions, on the dry weight basis, of about 0.2% to about 0.3%.

3. An improved egg white containing a tri-isopropyl alcohol ester of citric acid, said ester being present in proportions, on the dry weight basis, of about 0.2% to about 0.3%.

4. An improved liquid egg white containing a mixture of isopropyl alcohol di- and tri-esters of citric acid containing predominately the isopropyl alcohol di-ester of citric acid, said esters being present in proportions of 0.01% to 0.06%, by weight, of said liquid egg whites.

5. An improved liquid egg white containing from 0.02% to about 0.04%, by weight, of isopropyl alcohol di-ester of citric acid.

6. An improved frozen liquid egg white containing from 0.01% to about 0.06%, by weight, of at least one member selected from the group consisting of isopropyl alcohol di- and tri-esters of citric acid.

7. An improved frozen liquid egg white containing from 0.01% to about 0.06%, by weight, of isopropyl alcohol di-esters citric acid.

8. An improved liquid egg white having a pH below 7 and containing from 0.01% to about 0.06%, by weight, of at least one member selected from the group consisting of the isopropyl alcohol di- and tri-esters of citric acid.

9. An improved liquid egg white having a pH below 7 and containing from 0.01% to about 0.06%, by weight, of mixed isopropyl alcohol di- and tri-esters of citric acid comprising predominately isopropyl di-ester of citric acid.

References Cited in the file of this patent

UNITED STATES PATENTS

| 2,637,654 | Kothe | May 5, 1953 |
| 2,667,419 | Gooding et al. | Jan. 26, 1954 |